(12) United States Patent
Walsh

(10) Patent No.: US 6,646,696 B1
(45) Date of Patent: Nov. 11, 2003

(54) LIQUID CRYSTAL DISPLAY WITH TWISTED NEMATIC DIMMER

(75) Inventor: Kevin L. Walsh, Norcross, GA (US)

(73) Assignee: L3 Communications Corporation, New York, NY (US)

( * ) Notice: Subject to any disclaimer, the term of this patent is extended or adjusted under 35 U.S.C. 154(b) by 0 days.

(21) Appl. No.: 09/566,256

(22) Filed: May 5, 2000

(51) Int. Cl.⁷ ...................... G02F 1/1335; G02F 1/1347
(52) U.S. Cl. ......................... 349/65; 349/68; 349/74; 349/96
(58) Field of Search .............. 349/65, 68, 96, 349/74

(56) References Cited

U.S. PATENT DOCUMENTS

| | | | | |
|---|---|---|---|---|
| 4,436,379 A | * | 3/1984 | Funada et al. ............... 350/347 |
| 4,610,507 A | * | 9/1986 | Kamamori et al. .......... 350/335 |
| 5,221,978 A | * | 6/1993 | Heynderickx et al. ........ 359/53 |
| 5,315,420 A | * | 5/1994 | Narutaki et al. .............. 359/53 |
| 5,452,113 A | * | 9/1995 | Ikeno ........................... 359/53 |
| 5,726,723 A | * | 3/1998 | Wang et al. .................. 349/75 |
| 5,764,316 A | * | 6/1998 | Takizawa et al. .............. 349/1 |
| 6,028,656 A | * | 2/2000 | Buhrer et al. ................ 349/196 |
| 6,184,951 B1 | * | 2/2001 | Harrold et al. ................ 349/74 |

FOREIGN PATENT DOCUMENTS

EP        04-38817 A1  *  7/1991
JP        56-70524 A   *  6/1981

OTHER PUBLICATIONS 3M, 3M Dual Brightness Enhancement Film (DBEF), The Film That Gives Light A Second Chance; Copyright 3M, 1996; 6 pages; Published in USA.

* cited by examiner

Primary Examiner—Tarifur R. Chowdhury
(74) Attorney, Agent, or Firm—Gardner Groff, P.C.

(57) ABSTRACT

A backlit LCD display apparatus includes an LCD display panel, a light source for backlighting the LCD display panel, a loss-less polarizing element positioned between the backlight and the LCD display panel, and a dimmer device in the form of a twisted nematic LCD cell positioned between the polarizing element, and the LCD display panel

16 Claims, 4 Drawing Sheets

LIQUID CRYSTAL DISPLAY WITH TWISTED NEMATIC DIMMER

TECHNICAL FIELD

The present invention relates generally to display systems and, more specifically, to a liquid crystal display with a dimmer.

BACKGROUND OF THE INVENTION

For displaying electronic images and information, two types of displays are predominant. The first is a cathode ray tube (CRT) and the other is a flat panel display. In a CRT display, such as is commonly used in television sets and computer monitors, red, green and blue light is generated and is mixed together to represent desired colors. In such a scheme, white balance can be carefully controlled by varying the intensity of each of the red, green, and blue light sources. Moreover, the overall intensity of the image can be controlled as well. Thus, CRT displays are capable of producing images with accurate color representation and good intensity. However, CRT displays tend to require a lot of space in order to allow for the tube along which the cathode projects the emissions that cause the phosphorescent glow on the front of the CRT display screen.

By contrast, flat panel displays require very little space. However, they generally suffer from low brightness. One example of a flat panel display is a liquid crystal display (LCD). In high performance applications, the so-called AMLCD (active matrix liquid crystal display) is often employed. Another type of LCD display is the so-called TNLCD (twisted nematic liquid crystal display).

In order to improve the visibility (brightness) of these flat panel displays, it has been known in the art to provide a backlight for directing light through the flat panel display to illuminate it from behind. The backlight is normally constructed of a light-combining wedge designed to be placed closely behind the flat panel display. The light-combining wedge typically is provided with light by multiple light sources (typically white light sources) positioned along the edges of the light-combining wedge.

A typical twisted nematic LCD includes an LCD cell made up of liquid crystal molecules formed in distinct planes between two plates of glass, wherein the two plates of glass are positioned between two polarizing filters having a ninety degree difference in polarization. A backlight (typically a white-light source) is positioned behind the first polarizing filter to provide the necessary luminance. Typically, the liquid crystal molecules in the two outermost planes are positioned at a ninety degree angle relative to each other, with each plane in-between having a slightly different orientation from the plane above and below it, thus causing the polarization of light passing therethrough to twist ninety degrees as it passes through the liquid crystal. As a result, the light exiting the liquid crystals is aligned with the second polarizing filter, thus allowing the light to pass through to the observer. When an electric field is applied across the liquid crystal planes, the liquid crystal molecules realign themselves so that they are parallel to the electric field. Consequently, the polarized light passes through the liquid crystals without being twisted, thus contacting the second polarizing filter at a perpendicular polarization. In this state, the second polarizing filter acts as a shutter for individual pixels in the display and blocks the polarized light.

In high performance applications, an active matrix liquid crystal display (AMLCD) is often employed. In a commonly utilized AMLCD, switching transistors, known as thin film transistors (TFTs), activate each individual LCD pixel making it possible to control all pixels together at one time.

In the use of such flat panel displays, it is often desirable to control the dimming of the backlighting for various application settings, such as day/night operations. To achieve such an effect under the known prior art methods, either multiple lamps for separate day/night operation are utilized or the lamps are electronically controlled to vary the light intensity, thereby substantially increasing the cost and complexity of LCD's.

Accordingly, a new and improved dimmer for LCDs is needed that does not require the use of additional lamps or complex electronics. It is to the provision of such an improvement that the present invention is primarily directed.

SUMMARY OF THE INVENTION

Briefly described, in a first preferred form, the present invention both overcomes the above-mentioned disadvantages, and meets the recognized needs for such a device, by providing a light valve dimmer apparatus and method of use thereof, generally comprising a twisted nematic liquid crystal cell utilized in conjunction with an AMLCD. The present invention uses a twisted nematic cell not as a display, but instead as a dimmer device. Thus, the invention combines two LCD devices, one for use as a dimmer and one for use as a display device.

Preferably, the present invention comprises a backlit liquid crystal display apparatus which includes an LCD display panel and a light source positioned behind the LCD display panel. The liquid crystal display apparatus further includes a dimmer device positioned between the light source and the LCD display panel. The dimmer device includes a first polarizing element only. The dimmer device further includes a twisted nematic LCD cell positioned between the first polarizing element and the LCD display panel.

Preferably, the LCD display panel is an active matrix LCD display. Also preferably, the twisted nematic LCD cell comprises a single pixel cell which is sized to shroud the LCD display panel. Most preferably, the twisted nematic LCD includes an active area which is substantially matching in size to an active area of the LCD display panel.

More specifically, in a preferred embodiment, the TN liquid crystal cell is positioned between polarizing material, such as DBEF or DRP material, and the rear of the AMLCD, adjacent to the rear polarizer of the AMLCD. The backlight is placed behind the polarizing material to provide the necessary light source. As such, when the polarized light enters the non-energized TN liquid crystal cell, the polarization of the light is twisted ninety degrees and is thus, perpendicular to and misaligned with the rear polarizer. In this state, light is completely prevented from entering the AMLCD.

As an electric field is applied across the TN liquid crystal cell, the liquid crystal molecules partially or fully align with the electric field depending on the voltage applied. In the fully aligned state, the polarized light is not twisted by the TN liquid cell and is thus aligned with the rear polarizer of the AMLCD, thereby allowing the polarized light to enter the AMLCD. In the partially aligned state, the polarized light entering the TN liquid crystal will be partially twisted, thereby reducing the amount of light that is aligned with the rear polarizer of the AMLCD. As a result, the light is dimmed as it enters the AMLCD.

Accordingly, it is an object of the present invention to provide a liquid crystal display with dimmer apparatus and method that can function to block light partially, to block light fully, or to allow light to enter an LCD unimpeded.

It is another object of the present invention to provide a liquid crystal display with dimmer apparatus and method that can be incorporated into an LCD.

It is yet a further object of the present invention to provide a liquid crystal display with dimmer apparatus and method that does not require the use of additional lamps.

It is yet a further object of the present invention to provide a liquid crystal display with dimmer apparatus and method that does not require the use of complex electronics.

It is yet a further object of the present invention to provide a liquid crystal display with dimmer apparatus and method that is energy efficient and thus inexpensive to operate.

It is yet a further object of the present invention to provide a liquid crystal display with dimmer apparatus and method that is relatively impervious to temperature changes or humidity.

It is yet a further object of the present invention to provide a liquid crystal display with dimmer apparatus and method having high light transmission and low light loss.

BRIEF DESCRIPTION OF THE DRAWING FIGURES

The present invention, including its features and advantages, will be better understood by reading the Detailed Description of the Preferred Embodiment with reference to the accompanying drawing figures, in which.

DETAILED DESCRIPTION OF THE PREFERRED EMBODIMENT

In describing the preferred and alternate embodiments of the present invention, specific terminology is employed for the sake of clarity. The invention, however, is not intended to be limited to the specific terminology so selected.

Figure 1A:
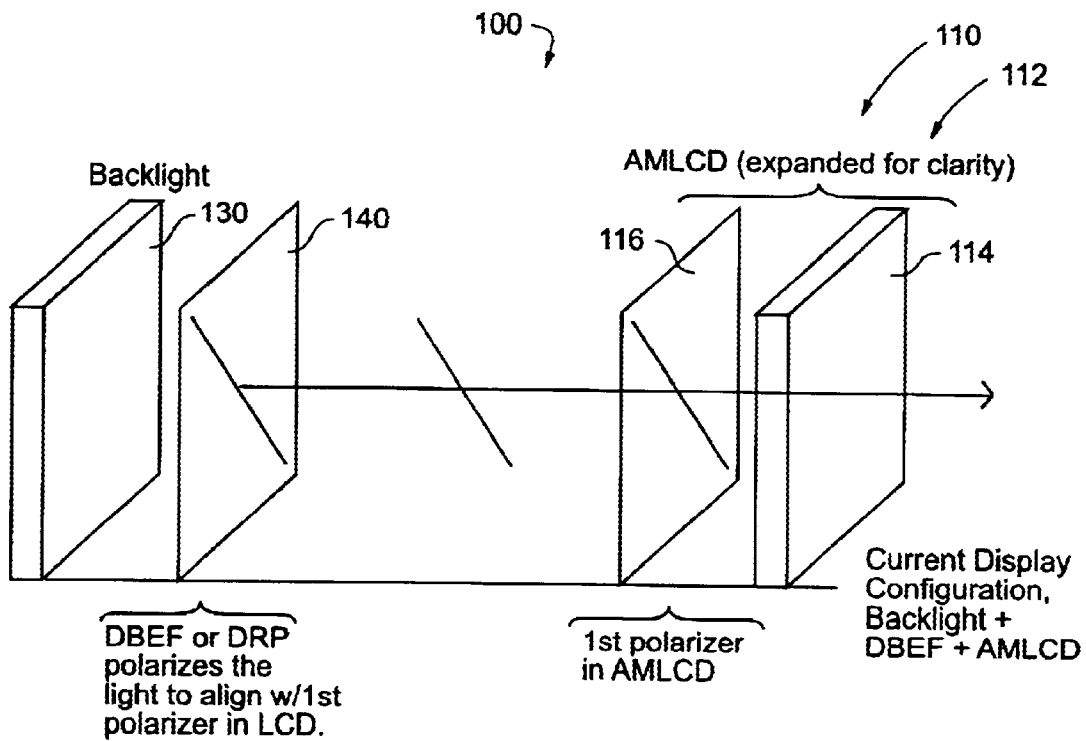
FIG. 1A is a schematic view of a typical prior art AMLCD complete assembly.

Referring now in detail to the drawing figures, wherein like reference numerals represent like parts throughout the several views, FIG. 1 shows a typical prior art AMLCD assembly 100 without the present invention incorporated therein. More specifically, the AMCLD assembly 100 comprises an AMLCD 110, and a backlight 130. The AMLCD 110, which is well-known within the art, generally comprises a liquid crystal section 112 sandwiched between a front polarizer 114 and a rear polarizer 116. For clarity of illustration, rear polarizer 116 of AMLCD 110 is shown separated from liquid crystal section 112. To provide the necessary light source, a backlight 130 is positioned behind the AMLCD 110. In some versions of the prior art a layer of 3-M DBEF material 140 is used as a backlight polarizer to enhance the brightness of the backlight. The backlight polarizer 140 typically is placed between backlight 130 and AMLCD 110 to polarize the light entering the AMLCD 110.

Figure 1B:
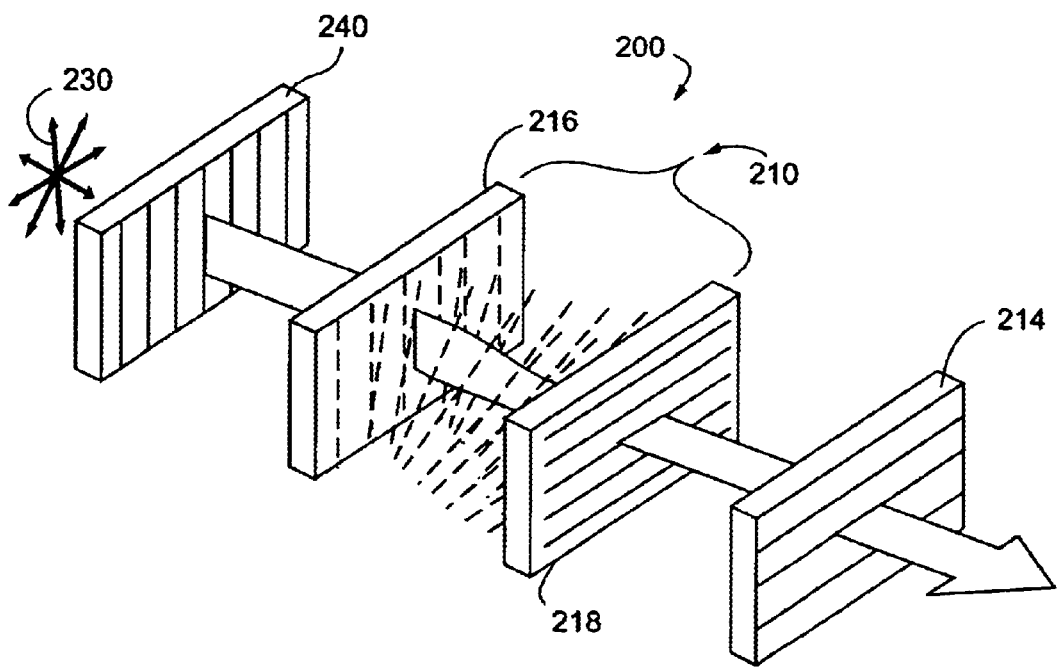
FIG. 1B is a schematic view of a typical twisted nematic LCD.

FIG. 1B shows a typical prior art TN LCD display, 200 including a backlight source 230, a rear polarizer 240, a twisted nematic LCD cell 210, and a front polarizer 214. The twisted nematic LCD cell 210 includes a rear plate (electrode) 216 and a front plate (electrode) 218, with liquid crystal molecules therebetween.

Figure 2:
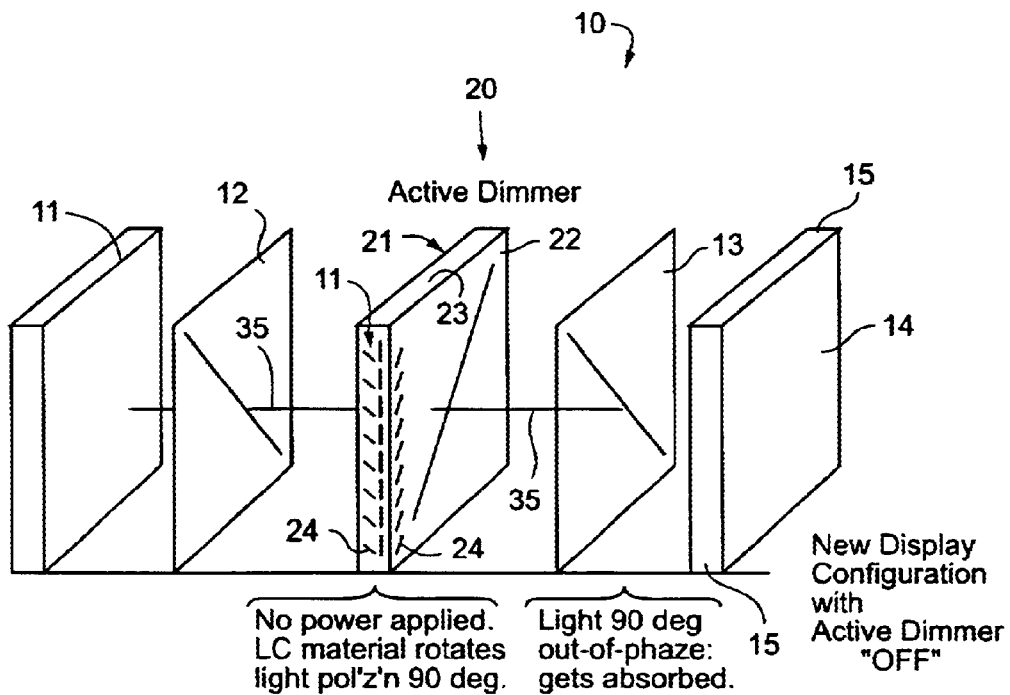
FIG. 2 is a schematic view of an apparatus according to a preferred form of the present invention shown in an active dimmer "off" state.
Figure 3:
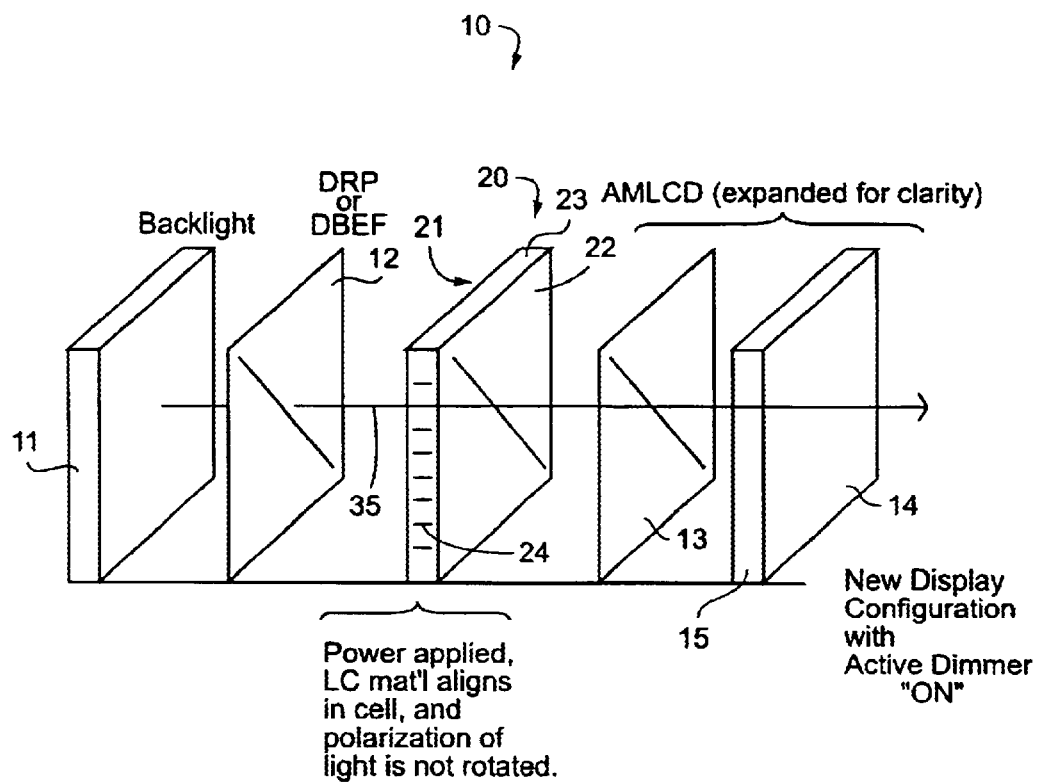
FIG. 3 is a schematic view of the apparatus of FIG. 2 shown in the active dimmer "on" state.

FIGS. 2 and 3 show a preferred form of the invention, namely a display assembly on apparatus 10 with an integrated dimmer. In FIG. 2 the dimmer is set to "off", while in FIG. 3 the dimmer is set to "on"(thereby allowing the LCD display to be illuminated from behind).

The display apparatus 10 includes a backlight 11 positioned behind a polarizing element 12, such as a DBEF material. This DBEF material serves both as a polarizing element and as a brightness-enhancing element to the overall display system by converting light which is incorrectly polarized, and thus wasted, such that all of the light has the same polarization alignment when entering the TN cell 20. Such a DBEF material is available from Minnesota Mining and Manufacturing (3M). The polarizing element 12, in turn, is positioned behind TN cell 20. The TN cell 20 includes a rear glass plate or electrode 21, a front glass plate or electrode 22, and a layer of liquid crystal material 23 between the front and rear glass plates.

The TN cell 20 is positioned behind a rear polarizing element 13. Rear polarizing element 13, in turn, is positioned behind an LCD display 15. Preferably, the display 15 is an active matrix liquid crystal display (AMLCD). LCD display 15 is positioned behind front polarizing element 14.

Preferably, the TN cell 20 comprises a single-pixel TN cell sized and configured to shroud the active area of the LCD display 15. Preferably, the active area of the single-pixel TN cell is at least as large as the active area of the LCD display 15.

The liquid crystal material 23 of the TN cell 20 includes several distinct planes of liquid crystal molecules 24, wherein the molecules in a first plane of liquid crystal molecules are ordinarily positioned generally perpendicular to the molecules in the last plane of liquid crystal molecules, and wherein each plane therebetween has a slightly different orientation from the plane above and below it. Thus, as polarized light 35 passes from backlight source 11 through the TN cell 20, it is twisted ninety degrees. As a result, polarized light 35 exiting TN cell 20 has a polarization ninety degrees different than rear polarizer 13 adjacent AMLCD 15 thus preventing any light 35 from entering AMLCD 15, as shown in FIG. 2.

When sufficient power is applied across TN cell 20, liquid crystal molecules 24, including molecules in a first plane, last plane and all planes in-between, align themselves to be parallel with the electric current. As such, polarized light 35 passes through the TN cell 20 without rotation and thus contacts rear polarizer 13 at an in-phase polarization, thereby allowing polarized light 35 to enter AMLCD 15.

To vary the amount of polarized light 35 entering the AMLCD 15, the voltage applied across the TN cell can be varied between zero and an amount less than the full power amount needed to cause total molecular alignment typically 6.0 volts AC. When a voltage is applied between said ranges, the molecules in the TN cell molecules partially align with the current flow, thus partially rotating some of polarized light 35. As such, the amount of polarized light 35 transmitted through polarizer 13 is reduced, thereby resulting in a variable dimming of AMLCD 15.

Although the preferred form of the present invention is herein described as being utilized for and in conjunction with AMLCD's, those skilled in the art will recognize that the present apparatus and method can be used with other types of LCDs and with other types of lighting.

Although the preferred form of the present invention is as described herein, there are additional embodiments which can be utilized to provide additional enhancements to the net display performance, for instance:

1. A polarization—preserving layer of diffusing material (e.g. 3M DFA—12, or other material) may be inserted between the TN cell 23 and the rear polarizer 13 to provide additional levels of luminance or color uniformity.
2. A polarizer layer may be inserted between TN cell 23 and rear polarizer 13 to provide additional levels of polarization.
3. A layer of polarization retarding film may be inserted between TN cell 23 and rear polarizer 13 to provide enhancements to the polarization of the light before it enters display device 15.
4. Any combination of the embodiments may be used singly or in groups to provide combined levels of enhancement to the display.

Having thus described the preferred forms of the present invention, those skilled in the art will additionally recognize that the disclosure is exemplary only, and that various other alternatives, adaptations, and modifications may be made within the spirit and scope of the present invention as set forth in the following claims.

What is claimed is:

1. A backlit liquid crystal display apparatus comprising:
an LCD display panel comprising a liquid crystal section and a rear polarizer;
a light source positioned behind the LCD display panel with the rear polarizer between the liquid crystal section and the light source, the light source operative for illuminating the LCD display panel; and
a dimmer positioned between the LCD display panel and the light source, the dimmer operative for variably controlling the illumination of the LCD display panel, wherein the dimmer comprises a brightness-enhancing polarizing element and a twisted nematic LCD cell positioned between the polarizing element and the rear polarizer of the LCD display panel.

2. The apparatus of claim 1 wherein the LCD display panel comprises an active matrix LCD display panel.

3. The apparatus of claims 1 wherein the twisted nematic LCD cell comprises a single pixel cell sized to shroud the LCD display panel.

4. The apparatus of claim 3 the twisted nematic LCD cell includes an active area substantially matching an active area of the LCD display panel.

5. The apparatus of claim 1 wherein the LCD display panel comprises a twisted nematic LCD display panel.

6. The apparatus of claim 1 wherein the LCD display panel further comprises a front polarizer positioned with the liquid crystal section between it and the rear polarizer.

7. The apparatus of claim 1 wherein the polarizing element of the dimmer has a polarity that is in alignment with a polarity of the rear polarizer of the LCD display panel.

8. A method for selectively controlling light entering an LCD display panel from a backlight, the LCD display panel comprising a liquid crystal section and a rear polarizer positioned between the liquid crystal section and the backlight, the method comprising the steps of:
positioning a polarizing element between the backlight and the LCD display panel;
positioning a twisted nematic LCD cell between the polarizing element and the rear polarizer of the LCD display panel; and
variably applying an electric voltage across the twisted nematic LCD cell to selectively control the intensity of the light passing through the twisted nematic LCD cell and entering the LCD display panel.

9. The method of claim 8 further comprising the steps of:
providing the twisted nematic LCD cell with a liquid crystal material having a plurality of distinct planes of liquid crystal molecules, including first molecules of a first plane, last molecules of a last plane, and intermediate molecules of one or more intermediate planes that are positioned between the first plane and the last plane; and A variably applying a first voltage across the twisted nematic LCD cell to orient the first plane molecules at an angle to the last plane molecules;
variably applying a second voltage across the twisted nematic LCD cell to orient the first plane molecules, the intermediate plane molecules, and the last plane molecules in alignment with each other; and
variably applying a voltage between the first voltage and second voltage across the twisted nematic LCD cell to orient the first plane molecules, the intermediate plane molecules, and the last plane molecules in partial alignment with each other.

10. A backlit liquid crystal display apparatus comprising:
an LCD display panel;
a light source positioned behind the LCD display panel and operative for illuminating the LCD display panel; and
a dimmer positioned between the LCD display panel and the light source, the dimmer operative for variably controlling the illumination of the LCD display panel, wherein the dimmer comprises a brightness-enhancing polarizing element and a twisted nematic LCD cell positioned between the polarizing element and the LCD display panel,
wherein the twisted nematic LCD cell comprises a liquid crystal material having a plurality of distinct planes of liquid crystal molecules, including first molecules of a first plane, last molecules of a last plane, and intermediate molecules of one or more intermediate planes that are positioned between the first plane and the last plane, and
wherein the first plane molecules are oriented at an angle to the last plane molecules in response to a first voltage being applied across the twisted nematic LCD cell, the first plane molecules, the intermediate plane molecules, and the last plane molecules are oriented in alignment with each other in response to a second voltage being applied across the twisted nematic LCD cell, and the first plane molecules, the intermediate plane molecules, and the last plane molecules are oriented in partial alignment with each other in response to a voltage between the first voltage and second voltage being applied across the twisted nematic LCD cell.

11. The apparatus of claim 10 wherein the angle of the first plane molecules to the last plane molecules when the first voltage is applied across the twisted nematic LCD cell is ninety degrees.

12. The apparatus of claim 10 wherein the polarizing element of the dimmer has a polarity that is in alignment with the first plane molecules, the intermediate plane molecules, and the last plane molecules when the second voltage is applied across the twisted nematic LCD cell.

13. The apparatus of claim 10 wherein, when the first voltage is applied across the twisted nematic LCD cell, the intermediate molecules of each of the intermediate planes are oriented with a slightly different orientation relative to the intermediate molecules of one of the intermediate planes adjacent to it.

14. The apparatus of claim 10 wherein the twisted nematic LCD cell further comprises two electrodes with the liquid crystal material positioned between them, wherein the electrodes are configured to permit the first to second voltages to be applied across them.

15. The apparatus of claim 10 wherein the first voltage is a zero voltage and the second voltage is a full voltage.

16. A backlit liquid crystal display apparatus comprising:

an LCD display panel having a liquid crystal section and rear polarizer positioned behind the liquid crystal section, the rear polarizer having a polarity;

a light source positioned behind the LCD display panel and operative for illuminating the LCD display panel; and a dimmer positioned between the LCD display panel and the light source, the dimmer comprising a polarizing element and a twisted nematic LCD cell positioned between the polarizing element and the rear polarizer, the polarizing element having a polarity that is in alignment with the polarity of the rear polarizer, the twisted nematic LCD cell comprising a liquid crystal material including first molecules of a first plane, last molecules of a last plane, and intermediate molecules of one or more intermediate planes that are positioned between the first plane and the last plane, wherein the first plane molecules are oriented perpendicular to the last plane molecules and to the polarity of the rear polarizer or the polarizing element in response to a first voltage being applied across the twisted nematic LCD cell, wherein the first plane molecules, the intermediate plane molecules, and the last plane molecules are oriented in alignment with each other and with the polarity of the rear polarizer and the polarizing element in response to a second voltage being applied across the twisted nematic LCD cell, and wherein the first plane molecules, the intermediate plane molecules, and the last plane molecules are oriented in partial alignment with each other and with the polarity of the rear polarizer and the polarizing element in response to a voltage between the first voltage and second voltage being applied across the twisted nematic LCD cell,wherein the dimmer is operative for variably controlling the illumination of the LCD displaypanel.

* * * * *

UNITED STATES PATENT AND TRADEMARK OFFICE
CERTIFICATE OF CORRECTION

PATENT NO. : 6,646,696 B1 Page 1 of 1
DATED : November 11, 2003
INVENTOR(S) : Kevin L. Walsh It is certified that error appears in the above-identified patent and that said Letters Patent is hereby corrected as shown below:

This certificate supersedes certificate of correction issued August 24, 2004, the number was erroneously mentioned and should be vacated since no certificate of correction was granted.

Signed and Sealed this

Nineteenth Day of April, 2005

JON W. DUDAS
*Director of the United States Patent and Trademark Office*